(12) United States Patent
Stein et al.

(10) Patent No.: US 11,509,499 B2
(45) Date of Patent: Nov. 22, 2022

(54) DETECTING ABNORMAL EVENTS IN VEHICLE OPERATION BASED ON MACHINE LEARNING ANALYSIS OF MESSAGES TRANSMITTED OVER COMMUNICATION CHANNELS

(71) Applicant: Saferide Technologies Ltd., Tel-Aviv (IL)

(72) Inventors: Yehiel Stein, Ramat HaSharon (IL); Yossi Vardi, Tel-Aviv (IL)

(73) Assignee: Saferide Technologies Ltd., Tel-Aviv (IL)

( * ) Notice: Subject to any disclaimer, the term of this patent is extended or adjusted under 35 U.S.C. 154(b) by 43 days.

(21) Appl. No.: 17/052,206

(22) PCT Filed: May 2, 2019

(86) PCT No.: PCT/IL2019/050494
§ 371 (c)(1),
(2) Date: Nov. 2, 2020

(87) PCT Pub. No.: WO2019/211856
PCT Pub. Date: Nov. 7, 2019

(65) Prior Publication Data
US 2021/0144026 A1    May 13, 2021

Related U.S. Application Data

(60) Provisional application No. 62/665,534, filed on May 2, 2018.

(51) Int. Cl.
*H04L 12/40* (2006.01)
*H04W 4/46* (2018.01)
(Continued)

(52) U.S. Cl.
CPC ....... *H04L 12/40052* (2013.01); *G06N 20/00* (2019.01); *H04W 4/46* (2018.02);
(Continued)

(58) Field of Classification Search
CPC .......... H04L 2012/40273; H04L 2012/40215; H04W 4/46; H04W 56/0025
See application file for complete search history.

(56) References Cited

U.S. PATENT DOCUMENTS 5,719,692 A * 2/1998 Cohen .................... G06N 5/025
706/14
9,443,314 B1 * 9/2016 Huang ................. G06K 9/6272
(Continued)

FOREIGN PATENT DOCUMENTS

WO   WO 2019/211856   11/2019

OTHER PUBLICATIONS

International Preliminary Report on Patentability dated Nov. 3, 2020 From the International Bureau of WIPO Re. Application No. PCT/IL2019/050494. (10 Pages).
(Continued)

*Primary Examiner* — Rasheed Gidado

(57) ABSTRACT

A computer implemented method of identifying an abnormal event in an operational environment of a vehicle, comprising using one or more processors adapted for receiving a plurality of messages intercepted by one or more devices adapted to monitor messages transmitted via one or more segments of one or more communication channels of a vehicle, applying a plurality of trained machine learning models to evaluate compliance of each of the intercepted messages with one or more baseline models according to feature(s) identified for each intercepted message, the baseline model(s) defining learned message patterns is created by training the plurality of machine learning models with a
(Continued)

plurality of training datasets comprising training messages reflecting valid operation of the vehicle, identifying incompliant intercepted message(s) which is incompliant with the baseline model(s), the incompliant message(s) is transmitted as result of one or more abnormal event and generating an alert indicative of the abnormal event(s).

15 Claims, 8 Drawing Sheets

(51) Int. Cl.
  *H04W 56/00* (2009.01)
  *G06N 20/00* (2019.01)
(52) U.S. Cl.
  CPC ............... *H04W 56/0025* (2013.01); *H04L 2012/40215* (2013.01); *H04L 2012/40273* (2013.01)

(56) References Cited

U.S. PATENT DOCUMENTS

| | | | | |
|---|---|---|---|---|
| 2004/0198389 A1* | 10/2004 | Alcock | ............... | H04W 4/029 455/457 |
| 2007/0036441 A1* | 2/2007 | Handley | ............. | G06K 9/6282 707/999.003 |
| 2010/0266058 A1* | 10/2010 | Murakami | .......... | H04L 27/2647 375/295 |
| 2011/0179100 A1* | 7/2011 | Kawai | ............... | H04L 29/08135 709/201 |
| 2013/0097103 A1* | 4/2013 | Chari | ..................... | G06N 20/10 707/E17.089 |
| 2016/0155066 A1* | 6/2016 | Drame | ................... | G06N 20/00 706/12 |
| 2016/0188396 A1* | 6/2016 | Sonalker | ............... | G06F 11/079 714/37 |
| 2017/0237773 A1 | 8/2017 | Wallace et al. | | |
| 2017/0353879 A1* | 12/2017 | Rad | ......................... | H04L 43/08 |

OTHER PUBLICATIONS

International Search Report and the Written Opinion dated Aug. 16, 2019From the International Searching Authority Re. Application No. PCT/IL2019/050494. (15 Pages).

Supplementary European Search Report and the European Search Opinion dated May 27, 2022 From the European Patent Office Re. Application No. 19796950.4. (13 Pages).

Markovitz et al. "Field Classification, Modeling and Anomaly Detection in Unknown CAN Bus Networks", Vehicular Communications, XP055411312, 9: 43-52, Jul. 2017.

* cited by examiner

DETECTING ABNORMAL EVENTS IN VEHICLE OPERATION BASED ON MACHINE LEARNING ANALYSIS OF MESSAGES TRANSMITTED OVER COMMUNICATION CHANNELS

RELATED APPLICATION SECTION

This application claims the benefit of priority of U.S. Provisional Patent Application No. 62/665,534 filed on May 2, 2018, the contents of which are incorporated herein by reference in their entirety.

BACKGROUND

The present invention, in some embodiments thereof, relates to identifying an abnormal event in an operational environment of a vehicle, and, more specifically, but not exclusively, to identifying an abnormal event in an operational environment of a vehicle based on machine learning analysis of messages transmitted in the vehicle.

The operation of vehicles, specifically ground vehicles such as, for example, cars, trucks, motorcycles, trains and/or the like has long ago become heavily reliant on automated systems utilizing multiple Electronic Control Units (ECU) deployed in the vehicle to control almost every aspect of the operation of the vehicle. This trend is naturally further intensifies with the evolution of autonomic vehicles where the human factor, i.e. the human driver, is no longer the prime controller of the vehicle which is rather controlled by the automated and autonomous systems.

These automated and autonomous systems may include a plurality of devices, for example, ECUs, sensors, Input/Output (I/O) controllers and/or the like communicating with each other to transfer status and/or control data essential for operating the vehicle. These systems may further exchange data with each other thus creating a comprehensive, complex ecosystem within the vehicle.

To support this data exchange, each vehicle may include multiple wired and/or wireless communication channels, for example, Controller Area Network (CAN) bus, Local Interconnect Network (LIN), FlexRay, Local area Network (LAN), Ethernet, automotive Ethernet, Wireless LAN (WLAN, e.g. Wi-Fi), Media Oriented Systems Transport (MOST), Wireless CAN (WCAN) and/or the like to support the data transfer between the deployed devices. The vehicle communication channels are often segmented due to one or more constraints and/or purposes, for example, a requirement for functional segregation, vehicle physical deployment constraints, a hierarchical communication structure and/or the like.

SUMMARY

According to a first aspect of the present invention there is provided a computer implemented method of identifying an abnormal event in an operational environment of a vehicle, comprising using one or more processors adapted for:

Receiving a plurality of messages intercepted by one or more devices adapted to monitor messages transmitted via one or more segments of one or more communication channels of a vehicle.

Applying a plurality of trained machine learning models to evaluate a compliance of each of the plurality of intercepted messages with one or more of a plurality of baseline models according to one or more of a plurality of features identified for each intercepted message. The baseline model(s) defining a plurality of learned message patterns is created by training the plurality of machine learning models with a plurality of training datasets comprising a plurality of training messages reflecting valid operation of the vehicle.

Identifying one or more incompliant intercepted messages which are incompliant with the one or more baseline model. The incompliant intercepted message(s) is transmitted as result of one or more abnormal event.

Generating an alert indicative of the abnormal event(s).

According to a second aspect of the present invention there is provided a system for identifying an abnormal event in an operational environment of a vehicle, comprising:

A program store storing a code; and

One or more processors coupled to the program store for executing the stored code, the code comprising:

Code instructions to receive a plurality of messages intercepted by one or more devices adapted to monitor messages transmitted via one or more segments of one or more communication channels of a vehicle.

Code instructions to apply a plurality of trained machine learning models to evaluate a compliance of each of the plurality of intercepted messages with one or more of a plurality of baseline models according to one or more of a plurality of features identified for each intercepted message. The baseline models defining a plurality of learned message patterns is created by training the plurality of machine learning models with a plurality of training datasets comprising a plurality of training messages reflecting valid operation of the vehicle.

Code instructions to identify one or more incompliant intercepted messages which are incompliant with one or more of the baseline model, the incompliant intercepted message(s) is transmitted as result of one or more abnormal events.

Code instructions to generate an alert indicative of the one or more abnormal events.

Detecting the abnormal events may be essential since the vehicles which constantly evolve to become highly automated and/or autonomous may be highly susceptible to malicious operation(s) and/or failure(s) of the vehicle's device(s) and/or system(s). It is therefore imperative to identify in real time the abnormal events indicative of such malicious operations and/or failures thus significantly reducing and potentially preventing harsh consequences which may result from these malicious operations and/or failures. Moreover, applying the machine learning algorithms to create the baseline model(s) may support efficient, comprehensive and/or accurate adaptation of the baseline model(s) to new operations modes, scenarios and/or patterns of the vehicle operation while significantly reducing the effort (e.g. human resources, computing resources, time, cost, etc.) required for the adaptation and/or deployment of the baseline model(s).

In an optional implementation form of the first and/or second aspects, one or more of the devices adapted to monitor the transmitted messages is a receiver-only device incapable of altering transmission signals on the segment(s) of the communication channel(s). This may prevent affecting the transmission signals on the communication channel(s) thus reducing the potential for a failed, compromised and/or malicious monitoring device(s) to affect and possibly jeopardize the operation of the communication channel(s).

In a further implementation form of the first and/or second aspects, the one or more processors are integrated in one or more vehicular devices of the vehicle. Detecting the abnormal events in real time in the vehicle may significantly reduce the response time for handling the detected abnormal events and therefore reducing the potential for damage, injury and/or fatalities which may result from the abnormal event(s).

In a further implementation form of the first and/or second aspects, the one or more processors are integrated in a remote system receiving the plurality of messages transmitted by the vehicle via one or more networks. Analyzing the intercepted messages at the remote system may allow applying significantly more computing resources (e.g. computing power, storage resources, etc.) compared to the vehicle computing resources which may be limited. Upon detection of the abnormal event(s) an indication of the abnormal event(s) may be transmitted back to the vehicle which may take further actions to counter the abnormal event(s). Moreover, analyzing the intercepted messages at the remote system for training the machine learning algorithms to further adjust the baseline model(s) may significantly improve accuracy, comprehensiveness and update of the baseline model(s).

In a further implementation form of the first and/or second aspects, the plurality of features comprising one or more members of a group consisting of: a message type, a message identifier, a message rate, a message timing, a sequence of messages in the subset, a message size, a message content, a correlation between one or more of the messages and one or more previously intercepted messages. Applying the machine learning algorithms to a wide variety of message features may significantly improve the ability of the machine learning algorithms to detect and learn message patterns and hence to detect the incompliant messages and abnormal event(s).

In a further implementation form of the first and/or second aspects, the plurality of machine learning algorithms comprise one or more parametric supervised algorithms trained with a plurality of labeled training datasets comprising a plurality of training messages having a plurality of predefined features to adjust the baseline model according to a label and one or more of the plurality of predefined features identified for each of the plurality of training messages, the label indicates a class of messages corresponding to a valid message transmission pattern reflecting valid operation of the vehicle. The parametric supervised algorithms may define a clear baseline of valid message transmission patterns reflecting the valid operation of the vehicle where each of the message transmission patterns is well defined (expressed) by predefined message features' values and/or patterns for the messages and/or of the unified time ordered datasets.

In a further implementation form of the first and/or second aspects, the plurality of machine learning algorithms comprise one or more non-parametric semi-supervised algorithms trained with a plurality of labeled training datasets comprising a plurality of training messages to adjust the baseline model according to a label of each of the plurality of training messages and one or more of a plurality of features learned for each training message, the label indicates a class of messages corresponding to a valid message transmission pattern reflecting valid operation of the vehicle.

The non-parametric semi-supervised algorithms may be applied to expand the valid message transmission patterns defined by the baseline model(s) to include learned values and/or patterns of the features of the messages and/or of the unified time ordered datasets.

In a further implementation form of the first and/or second aspects, the plurality of machine learning algorithms comprise one or more non-parametric unsupervised algorithms trained with a plurality of unlabeled training datasets comprising a plurality of training messages to adjust the baseline model according to one or more valid messages transmission pattern identified based on one or more of the plurality of features learned for each of the plurality of training messages. The Non-parametric unsupervised algorithms may further expand the baseline model(s) to include learned message transmission patterns which are expressed by learned values and/or patterns of the features of the messages and/or of the unified time ordered datasets.

In a further implementation form of the first and/or second aspects, one or more of the plurality of machine learning algorithms are trained to evaluate compliance of one or more of the plurality of intercepted messages independently of other intercepted messages. Some of the intercepted messages may be independent of other messages and therefore it may be essential to evaluate and determine compliance/incompliance of such intercepted messages independently of other intercepted messages.

In a further implementation form of the first and/or second aspects, one or more of the plurality of machine learning algorithms are trained to evaluate compliance of one or more of the plurality of intercepted messages according to a correlation between the one or more intercepted message and one or more other intercepted messages. Evaluating and determining compliance/incompliance of intercepted messages in dependence with other intercepted messages may be further improve the ability of the machine learning algorithms to detect the incompliant intercepted message(s) since message patterns defined by multiple messages may be significantly easier to follow and detect.

In an optional implementation form of the first and/or second aspects, one or more dimensions of the plurality of intercepted messages are reduced by filtering out one or more of the plurality of intercepted messages according to one or more filtering rules. Reducing the dimensions of the intercepted messages may significantly reduce complexity, computing resources, networking resources, storage resources, time and/or the like required to process the intercepted messages which may constitute extremely large data volumes.

In an optional implementation form of the first and/or second aspects, one or more subsets of the plurality of messages are arranged in one or more unified time ordered datasets created according to one or more message arrangement rules defining consolidation of the one or more subsets according to one or more message attributes, the message attributes are members of a group consisting of: an originating vehicular device, a destination vehicular device, a message type, a message identifier, a message content, a message timing, a type of the communication channel and an identifier of the one or more segments. Arranging subsets of intercepted messages in the unified time ordered datasets may significantly improve the context of the messages of the subset in time context and/or in space context (i.e. the communication channel where the message is intercepted).

In a further implementation form of the first and/or second aspects, the plurality of trained machine learning models to evaluate a compliance of the one or more unified time ordered datasets with one or more of the baseline models according to one or more of: a correlation between the one or more unified time ordered datasets and one or more other unified time ordered datasets and one or more of the plurality of features identified for at least some of the messages of the one or more unified time ordered datasets. Providing the additional context information to the machine learning algorithms may further improve the ability of the machine learning algorithms to detect the incompliant intercepted message(s).

In an optional implementation form of the first and/or second aspects, one or more of the baseline model(s) defines one or more condition variables associated with one or more of valid operations of the vehicle under one or more operational conditions. Adapting and/or adjusting one or more of the baseline models to predefined conditions, for example, weather conditions, road conditions, geographical area conditions and/or the like may allow associating certain message patterns with certain conditions. The machine learning algorithms may therefore be significantly stricter since compliance may be determined in a tighter range of acceptable message patterns as defined by the condition variables.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
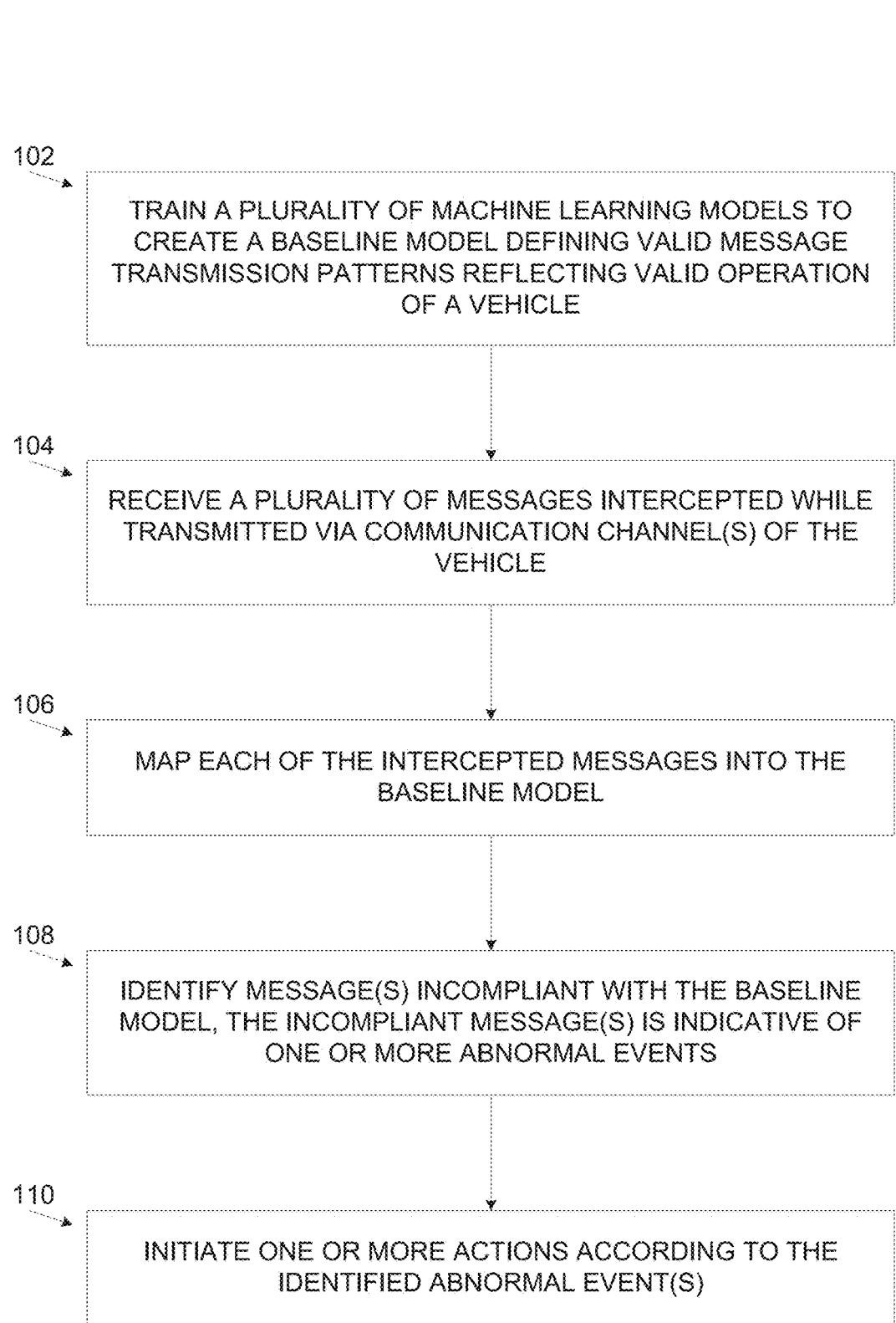
FIG. 1 is a flowchart of an exemplary process of identifying abnormal events in an operational environment of a vehicle, according to some embodiments of the present invention.

The present invention, in some embodiments thereof, relates to identifying an abnormal event in an operational environment of a vehicle, and, more specifically, but not exclusively, to identifying an abnormal event in an operational environment of a vehicle based on machine learning analysis of messages transmitted in the vehicle.

According to some embodiments of the present invention, there are provided methods and systems for identifying one or more abnormal events (operational anomalies) during operation of a vehicle, specifically a ground vehicle, for example, a car, a truck, a motorcycle, a train and/or the like. Identifying the abnormal events is done by intercepting a plurality of messages exchanged between devices of the vehicle over one or more communication channels and identifying one or more messages which do not comply with a baseline model defining massage transmission patterns reflecting valid (normal) operation and/or behavior of the vehicle including, for example, operations states and/or transitions between the operation states.

The baseline model is created during a training phase using a plurality of machine learning models, for example, parametric supervised algorithms, non-parametric semi-supervised algorithms, non-parametric unsupervised algorithms and/or the like trained with a plurality of training samples comprising messages sequences reflecting and/or simulating the valid operation of the vehicle. The different types of the machine learning models may be applied independently, simultaneously and/or in sequence to create the baseline model such that the baseline model defining the valid operation of the vehicle is constructed as a flat, a hierarchical, a layered and/or a sequenced model.

The plurality of training samples comprising training messages sequences reflecting and/or simulating the valid operation of the vehicle are selected, created and/or adapted according to each of the types of the machine learning models. The parametric supervised algorithms, for example, may be trained with annotated (labeled) training datasets comprising message sequences having predefined features (parameters) values and labeled with respective labels associating each message with a respective class corresponding to valid operation of the vehicle. The message features may include for example, a message rate, a messages size, a messages payload (content), a sequence of messages, cross-correlation of messages across different network segments, cross-correlation of payload between multiple different messages, cross-correlation of messages over time and/or the like. The non-parametric semi-supervised algorithms may be trained with annotated (labeled) training datasets comprising training message sequences having features which are not predefined. The non-parametric unsupervised algorithms may be trained with unlabeled (unannotated) training datasets and may update the baseline model by clustering the training messages of the training datasets according to characteristics, attributes and/or relations detected and learned for the training messages of the training datasets and/or between them.

Optionally, the machine learning models are trained with training datasets comprising unified time ordered datasets of messages. The unified time ordered datasets may be created according to one or more message arrangement rules which may define consolidation of multiple messages to a respective unified time ordered messages dataset. The message arrangement rules may define time based arrangement such that the unified time ordered messages dataset are arranged according to a timing of transmission (and interception) of each of the messages thus consolidating groups of the plurality of messages in a time continuum. For example, a certain message arrangement rule may dictate grouping together multiple messages intercepted within a certain time period, for example, five seconds and/or the like. In another example, a certain message arrangement rule may dictate grouping together multiple messages of the same type intercepted at a specific time period, for example, every round hour and/or the like.

The message arrangement rules may further define space based arrangement such that the unified time ordered messages dataset are arranged to include messages according to an interception location, i.e. a communication channel(s) and/or a segment(s) thereof thus consolidating groups of the plurality of messages in a space continuum. The baseline model is therefore adapted to reflect the features of unified time ordered datasets comprising multiple messages. For example, a certain message arrangement rule may dictate grouping together multiple messages intercepted at a certain communication channel, for example, a CAN bus. In another example, a certain message arrangement rule may dictate grouping together multiple messages of the same type intercepted at two communication channels connected through a certain bridge.

The message arrangement rules may also dictate grouping together multiple messages to create unified time ordered datasets based on both time and space attributes. For example, a certain message arrangement rule may dictate grouping together multiple messages intercepted at a certain communication channel segment during a certain time period, for example, 3 seconds and/or the like.

In real time, a plurality of messages exchanged between devices and/or systems of the vehicle may be intercepted by one or more monitoring devices deployed to monitor one or more of the communication channels of the vehicle and/or segments thereof. The monitoring device(s) may optionally be configured as passive receiver-only device incapable of injecting data to the communication channels. The monitoring device(s) may be coupled to the communication channel(s) in an isolated manner thus incapable of inducing, altering, manipulating and/or otherwise affecting the transmission signals of the communication channels in any way.

Each of the intercepted messages may be mapped (clustered, classified, etc.) to the baseline model created during the training phase to determine compliance of the intercepted message compared to the baseline model. Incompliance of one or more messages with the baseline model may be indicative of one or more abnormal events (operational anomalies). Such abnormal events may indicate of one or more potentially malicious devices which transmit non-compliant message(s) in an attempt to disrupt, compromise and/or affect the normal operation of the vehicle. Additionally and/or alternatively, such abnormal events may be indicative of one or more devices and/or systems of the vehicle experiencing (exhibiting) a malfunction(s), failure(s), degraded functionality and/or the like.

In case of detection of the abnormal event(s), i.e. the non-compliant message(s), one or more actions may be initiated, for example, generating an alert to one or more local and/or remote automated systems, generating an indication to a driver, a user, a passenger and/or an operator of the vehicle and/or the like. Optionally, further proactive operations may be taken in response to the abnormal event detection, for example, operate one or more devices and/or systems of the vehicle to prevent, circumvent and/or bypass potentially malicious and/or erroneous control message(s), apply security measures to identify and/or isolate the potentially malicious device(s), deploy emergency and/or maintenance procedures to encounter the malfunction(s) and/or failure(s) and/or the like.

Abnormal event detection using the baseline model created using the machine learning models may present significant advantages and benefits. First, vehicles, in particular ground vehicles are constantly evolving and becoming more automated with the final goal to become completely autonomous. These vehicles may be highly susceptible to malicious operation(s) and/or failure(s) of the vehicle's device(s) and/or system(s) which may inflict major effects to the vehicle, its passenger(s), other vehicles, infrastructure and/or people in the vehicular environment. Such effects may include, for example, accident(s) and/or the like having major consequences ranging from damage through injury(s) to fatalities. It is therefore imperative to identify in real time abnormal events indicative of such malicious operations and/or failures thus significantly reducing and potentially preventing these harsh consequences.

Some existing methods may apply rule based methods and/or systems to detect the abnormal event(s) by comparing transmission of the intercepted messages to predefined rules and identifying incompliance with the rules. Such rule based implementations may require identifying in advance most if not all possible valid, legitimate and/or normal operation modes or states of the vehicle. Such rule based methods may further attempt to predict potential abnormal events and define the respective message transmission rules. The rule based approach may naturally be very limited as it is impossible to predict all operation modes and states as well as abnormal events in advance.

The baseline model on the other hand may automatically and constantly evolve through training using the machine leaning algorithms to adapt to new vehicle operation scenarios. In addition, the baseline model may be updated using large volumes of realistic training datasets thus significantly improving the accuracy and comprehensiveness of the baseline model. Detecting the abnormal events using the baseline model may therefore be significantly more comprehensive, accurate and/or effective compared to the rule based implementations. In addition, adaptation of the rule based methods and/or systems to new operational modes/states and/or abnormal events may require extensive efforts and/or time to design new rules, to verify proper operation of the adjusted system, to re-deploy the adjusted system in the vehicles and/or the like. In contrast, the baseline model deployed in the vehicle automatically evolves in real time and may therefore significantly reduce such efforts and/or time for adjusting, verifying and/or deploying the system.

Furthermore, applying multiple types of machine learning models may significantly enhance accuracy, comprehensiveness and/or efficiency of the created baseline model used for detecting the abnormal events. While each of the classifier types may present some benefits and advantages, they may each suffer some inherent deficiencies. Applying a combination of all types of the machine learning models may therefore result in the baseline model being a highly accurate and comprehensive model which overcomes the limitations and/or deficiencies presented by each type of algorithms individually. For example, the parametric supervised algorithms may define a clear baseline of valid message transmission patterns reflecting the valid operation of the vehicle where each of the message transmission patterns is well defined (expressed) by predefined message features' values and/or patterns for the messages and/or of the unified time ordered datasets.

However, by their nature the parametric supervised algorithms may be limited to the features' values and patterns predefined for the message transmission patterns. To overcome this, the non-parametric semi-supervised algorithms may be applied to expand the valid message transmission patterns defined by the baseline model to include learned values and/or patterns of the features of the messages and/or of the unified time ordered datasets. The Non-parametric unsupervised algorithms may further expand the baseline model to include learned message transmission patterns which are expressed by learned values and/or patterns of the features of the messages and/or of the unified time ordered datasets.

In addition, using the receiver-only monitoring device(s) for intercepting the messages without affecting the transmission signals of the communication channel(s) may significantly reduce the potential for a failed monitoring device(s) to affect and possibly jeopardize the operation of the communication channel(s). Moreover, malicious adversaries may not use a compromised and/or malicious monitoring device(s) to inject potentially malicious and/or harmful messages in the operational system of the vehicle.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of identifying abnormal events in an operational environment of a vehicle, according to some embodiments of the present invention. A process 100 may be executed to identify one or more abnormal events during operation of a vehicle, specifically a ground vehicle by applying trained machine learning models to trained to identify one or more messages exchanged over communication channels of the vehicle which do not comply with a baseline model defining messages transmission patterns reflecting valid, legitimate and/or normal operation of the vehicle including, for example, operation states of the vehicle and/or transitions between the states.

The baseline model may be created during a training phase using the plurality of machine learning models, for example, parametric supervised algorithms, non-parametric semi-supervised algorithms, non-parametric algorithms and/or the like. Each of the groups of machine learning models may be trained with training datasets comprising message sequence(s) designed, constructed and/or selected according to the characteristics of the respective machine learning models, specifically the training datasets may be labeled (annotated) or not and may include message features (parameters) which are predefined or not.

In real time, a plurality of messages exchanged between devices and/or systems of the vehicle may be intercepted by one or more monitoring devices deployed to monitor one or more communication channels of the vehicle and/or segments thereof.

Each of the plurality of intercepted messages may be mapped (e.g. clustered, classified, etc.) to the baseline model created during the training phase to determine compliance of the intercepted message compared to the baseline model. Incompliance of one or more messages with the baseline model may be indicative of an abnormal event in which one or more potentially malicious devices transmitted the non-compliant message(s). Additionally and/or alternatively, such non-compliant message(s) may be indicative of an abnormal event in which one or more legitimate devices and/or systems of the vehicle experience (exhibit) one or more malfunctions and/or failures.

In the event of detection of the abnormal event(s), i.e. the non-compliant message(s), one or more actions may be initiated, for example, initiating an abnormal event alert and/or the like, informing one or more local and/or remote systems of the abnormal event and/or the like. optionally, further proactive operations may be taken in response to the abnormal event detection, for example, operate the vehicle to prevent, circumvent and/or bypass potentially malicious and/or erroneous control message(s), apply security measures to identify and/or isolate the potentially malicious device(s), deploy emergency and/or maintenance procedures to encounter the malfunction(s) and/or failure(s) and/or the like.

Figure 2:
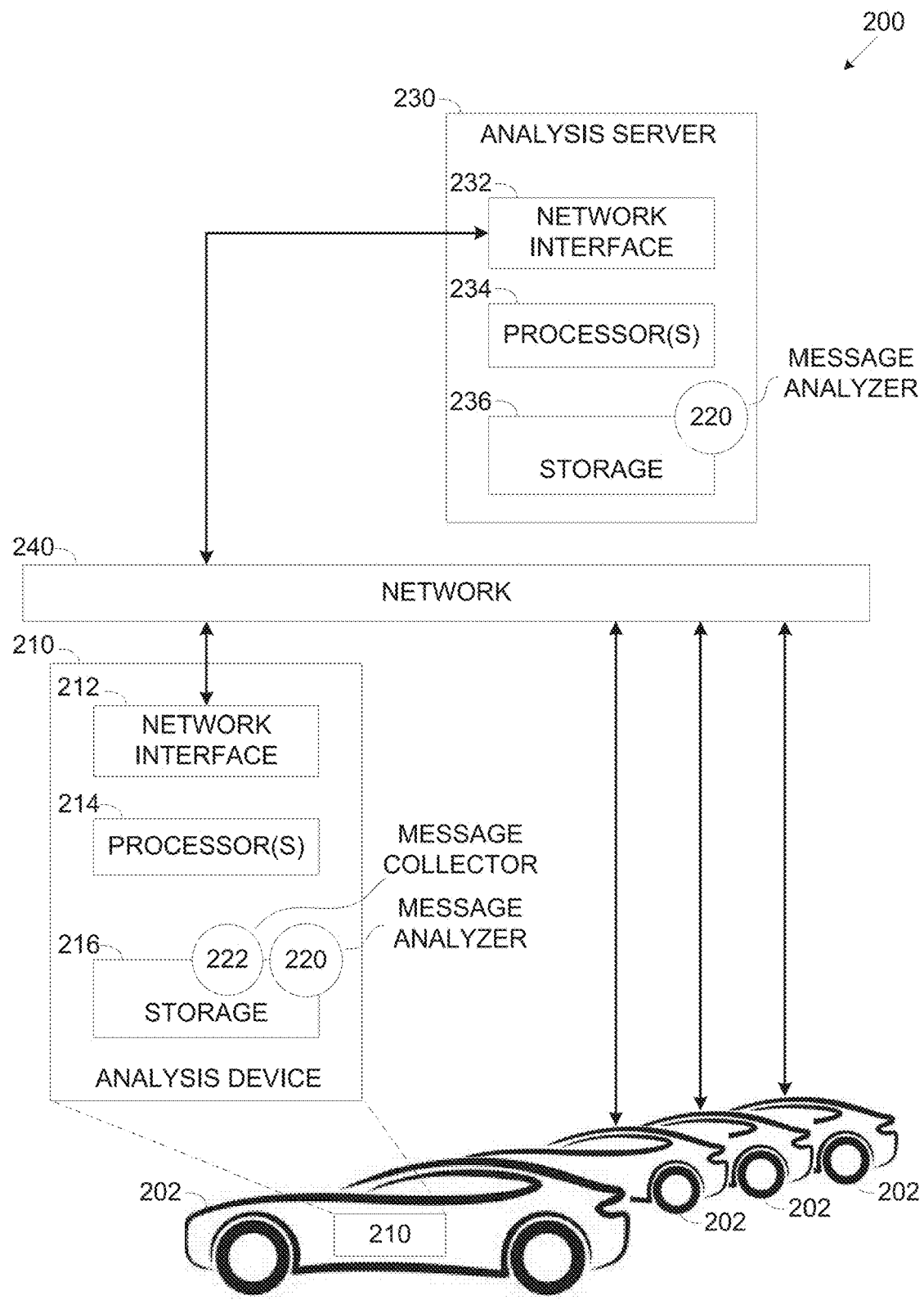
FIG. 2 is a schematic illustration of an exemplary system for identifying an abnormal event in an operational environment of a vehicle, according to some embodiments of the present invention.

Reference is also made to FIG. 2, which is a schematic illustration of an exemplary system for identifying an abnormal event in an operational environment of a vehicle, according to some embodiments of the present invention. An exemplary system 200 may include one or more vehicles 202 specifically ground vehicles, for example, a car, a truck, a motorcycle, a train and/or the like.

According to some embodiments of the present invention one or more of the vehicles 202 includes a respective analysis device 210 adapted to execute a process such as the process 100. However, according to some embodiments of the present invention the process 100 is executed by a remote analysis server 230 for one or more vehicles 202 operatively connected to the analysis server 230 via a network 240 comprising one or more wired and/or wireless networks, for example, a Radio Frequency (RF) link, a LAN, a WLAN, a Wide Area Network (WAN), a Municipal Area Network (MAN), a cellular network, the internet and/or the like. Optionally, in some embodiments, one or more vehicles 202 are not continuously connected to the analysis server 230 but rather connect to the analysis server 230 occasionally, periodically, on demand and/or the like. For example, a certain vehicle 202 may connect to the remote analysis server 230 when parked in a certain parking space, for example, at home, at a work place and/or the like. Moreover, the certain vehicle 202 may take advantage of networking capabilities and/or infrastructures provided by the parking space, for example, connectivity to the network 240. In such case, the certain vehicle 202 may connect to the parking space network infrastructure, for example, a wireless router (e.g. Wi-Fi router) serving as a gateway to provide access to the network 240 and through it to the analysis server 230.

The analysis device 210 may include a network interface 212 to provide connectivity for the vehicle 202, a processor(s) 214 for executing a process such as the process 100 and storage 216 for storing program code (serving as program store program store) and/or data. The network interface 212 may include one or more wired and/or wireless network interfaces for connecting to the network 240. The processor(s) 214, homogenous or heterogeneous, may include one or more processing nodes arranged for parallel processing, as clusters and/or as one or more multi core processor(s). The storage 216 may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like.

The processor(s) 214 may execute one or more software modules, for example, a process, a script, an application, an agent, a utility, a tool and/or the like each comprising a plurality of program instructions stored in a non-transitory medium such as the storage 216 and executed by one or more processors such as the processor(s) 214. For example, the processor(s) 214 may execute an analyzer module 220 for executing the process 100 to identify abnormal event(s) in the operational environment of the vehicle 202 and take action accordingly.

In case the process 100 is executed by the remote analysis server 230, the processor(s) 214 may execute a message collector module 222 for collecting intercepted messages exchanged over one or more communication channels of the vehicle 202. The message collector 222 may further transmit the intercepted messages and/or part thereof to the remote analysis server 230 via the network interface 212 connected to the network 240.

The analysis server 230 may include a network interface 232 such as the network interface 212 to provide connectivity for the analysis server 230, a processor(s) 234 such as the processor(s) 214 for executing a process such as the process 100 and storage 236 for storing program code (serving as program store program store) and/or data. Similarly to the storage 216, the storage 236 may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like. The storage 236 may further comprise one or more network storage devices, for example, a storage server, a network accessible storage (NAS), a network drive, and/or the like.

The processor(s) 234 may execute one or more software modules, for example, a process, a script, an application, an agent, a utility, a tool and/or the like. For example, the processor(s) 234 may execute an analyzer module such as the analyzer 220 for executing the process 100 to identify abnormal event(s) in the operational environment of the vehicle 202 and take action accordingly.

Optionally, the analysis system 230 and/or the analyzer 220 executed by the analysis system 230 are provided as one or more cloud computing services, for example, Infrastructure as a Service (IaaS), Platform as a Service (PaaS), Software as a Service (SaaS) and/or the like such as, for example, Amazon Web Service (AWS), Google Cloud, Microsoft Azure and/or the like.

Figure 3:
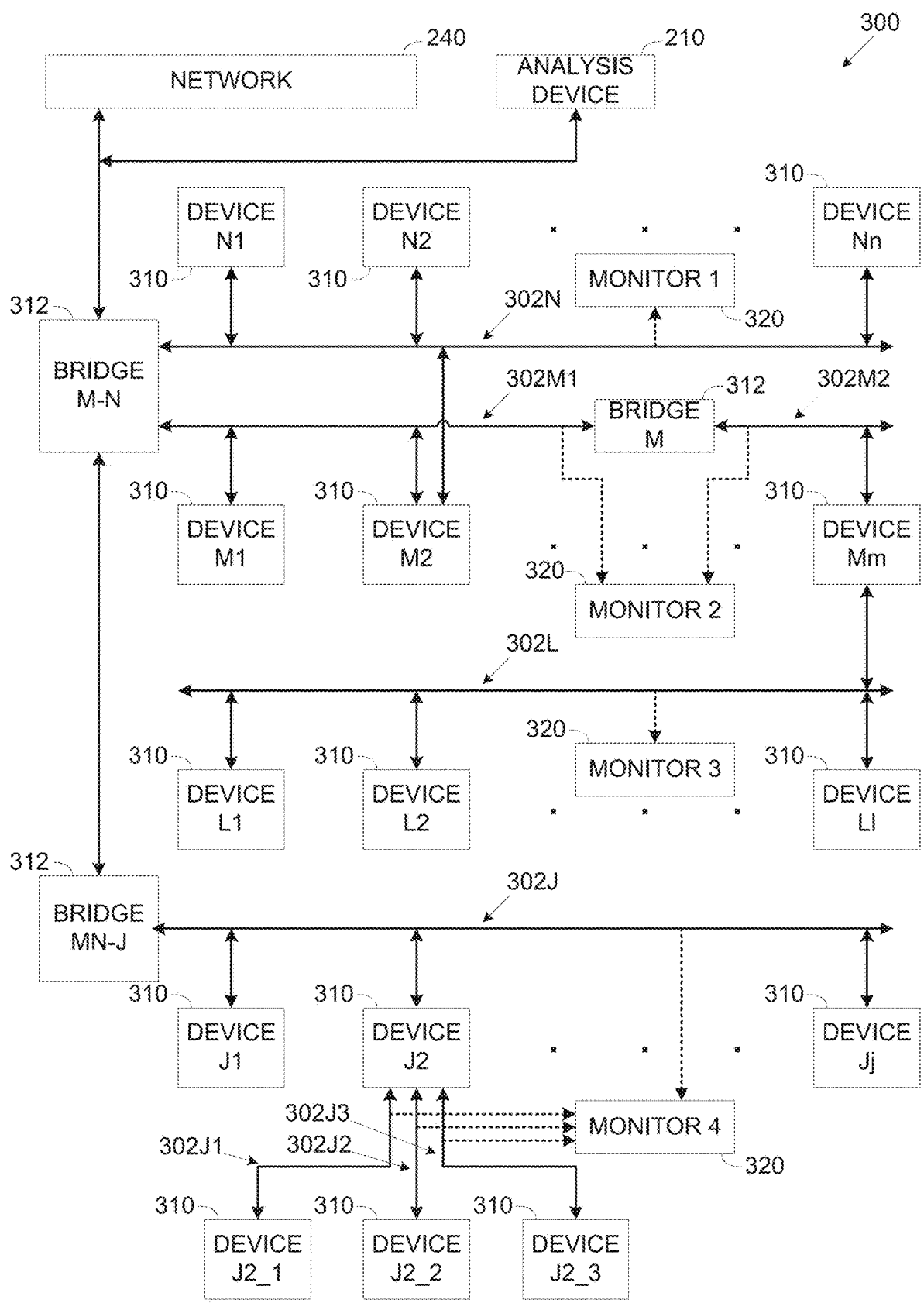
FIG. 3 is a schematic illustration of an exemplary system for intercepting communication messages exchanged over communication channels of a vehicle, according to some embodiments of the present invention.

Reference is now made to FIG. 3, which is a schematic illustration of an exemplary system for intercepting communication messages exchanged over communication channels of a vehicle, according to some embodiments of the present invention. An exemplary system 300 may be deployed in a vehicle such as the vehicle 202 for intercepting messages exchanged between a plurality of devices 310 deployed in the vehicle 202 for collecting data relating to the operation of the vehicle 202 and/or for controlling one or more functions and or systems of the vehicle 202. The devices 310 may include for example, sensor(s), ECU(s), I/O controller(s), communication controller(s) and/or the like. The topology and deployment of the system 300 is exemplary and should not be construed as limiting since multiple other deployments, topologies and/or layouts may be implemented as known in the art.

The sensors may include one or more sensors, for example, an engine operation sensor, an environmental condition sensor (e.g. temperature sensor, a light sensor, a humidity sensor, etc.), a navigation sensor (e.g. a Global Positioning System (GPS) sensor, an accelerometer, a gyroscope, etc.), an imaging sensor (e.g. a camera, a night vision camera, a thermal camera, etc.) and/or the like. The ECUs may include one or more processing units and/or controllers adapted to operated, control and/or execute one or more functions of the vehicle 202, for example, steering, accelerating, breaking, parking, information collection, safety system control, multimedia system control, door control, window control and/or the like. The I/O controllers may include one or more controllers adapted to connect to one or more of the sensors, the ECUs and/or the like. The I/O controllers may include one or more controllers adapted to operate one or more user interfaces, for example, a pointing device, a keyboard, a display, an audio interface and/or the like. The communication controllers may include one or more controllers adapted to connect to the network 240. Optionally, one or more of the devices 310 may be integrated devices comprising one or more of the sensors, the ECUs, the I/O controllers, the communication controllers and/or the like.

The devices 310 may communicate with each other by sending messages over one or more wired and/or wireless (vehicle) communication channels 302 deployed in the vehicle 202, for example, CAN bus, LIN, FlexRay, LAN, Ethernet, automotive Ethernet, WLAN (e.g. Wi-Fi), WCAN, MOST and/or the like. The topology of the system may vary and may include a plurality of communication channels 302 of various types and various topologies (e.g. bus, point-to-point, multi-drop, etc.) which may be further segmented. By deploying specific types of communication channels 302 and optionally segmenting one or more of them, the topology of the system 300 may be adapted to accommodate one or more needs, constraints and/or objectives of the system 300, for example, apply segregated domain(s) for sensitive devices 310, adapt to deployment physical limitation(s) of the vehicle 202 (e.g. limited space, long distances, etc.), create a hierarchical structure(s) for at least some of the devices 310 and/or the like.

For example, one or more devices 310, for example, a device 310 N1, a device 310 N2 through device 310 Nn may connect to a communication channel 302N, for example, a LIN. In another example, one or more devices 310, for example, a device 310 M1, a device 310 M2 through device Mm may connect to a segmented communication channel 302M, for example, a CAN bus comprising two CAN bus segments 302M1 and 302M2. In another example, one or more devices 310, for example, a device 310 L1, a device 310 L2 through device 310 Ll may connect to a communication channel 302L, for example, a MOST. In another example, one or more devices 310, for example, a device 310 J1, a device 310 J2 through a device 310 Jj may connect to a communication channel 302J, for example, a Wi-Fi network.

The system 300 may further include one or more bridges 312 adapted to connect between communication channels 302 of different types and/or between segments of one or more of the communication channels 302. The bridges 312 may transfer one or more messages from one communication channel 302 to another communication channels 302 in one or both directions to allow propagation of messages between the communication channels 302. Naturally, each bridge 312 includes the appropriate interfaces and/or ports for connecting to the respective communication channels 302 it connects to. For example, a bridge 312 M-N may connect the communication channel 302N and the communication channel 302M. In another example, a bridge 312 MN-J may connect the communication channels 302N and 302M with the communication channels 302J. In another example, a bridge 312 M may connect between the segments 302M1 and 302M2 of the communication channels 302M.

One or more of the devices 310 may also serve as a bridge 312. For example, the device 310 Mm may bridge between the communication channel 302M, specifically the segment 302M2 of the communication channel 302M and the communication channel 302L. In another example, the device 310 J2 may serve as a bridge 312 for connecting a device 310 J1, a device 310 J2 and/or a device 310 J3 to the communication channel 302J where the device 310 J1 connects to the device 310 J2 through a communication channel 302J1, the device 310 J2 connects to the device 310 J2 through a communication channel 302J2 and the device 310 J3 connects to the device 310 J2 through a communication channel 302J3. The communication channels 302J1, 302J2 and/or 302J2 may be of the same type and/or of different types.

The system 300 may further include one or more monitoring devices 320 for monitoring and intercepting communication, specifically messages exchanged between the devices 310 over the communication channels 302. The system 300 may include a central monitor 320 which may connect to a plurality of the communication channels 302. However, the system 300 may include a plurality of monitors 320, for example, a monitor 320 1 which monitors the communication channel 302N, a monitor 320 2 which monitors the communication channel 302M specifically the segments 302M1 and 302M2, a monitor 320 3 which monitors the communication channel 302L, a monitor 320 4 which monitors the communication channel 302J and/or the like. The monitor 320 4 may further monitor one or more of the communication channels 302J1, 302J2 and/or 302J3. One or more of the monitors 320 may be integrated in one or more of the devices 310 and/or the bridges 312 such that in addition to its normal operation the integrated device 310 or the integrated bridge 312 may monitor and intercept messages transmitted on the respective communication channel(s) 302 it connects to. According to some embodiments of the present invention, the monitors 320 are receive-only devices which are only capable of intercepting (receiving) the messages transmitted on the communication channel(s) 302 while unable to transmit messages or affect the communication channel(s) 302 in any way.

The monitoring device(s) 320 adapted to intercept the messages exchanged over the communication channels 302 may optionally be configured as passive receiver-only device incapable of injecting data to the communication channels 302. Furthermore the monitoring device(s) 320 may be coupled to the communication channels 302 in an isolated manner thus incapable of inducing, altering, manipulating and/or otherwise affecting the transmission signals of the communication channels 302 in any way. For example, one or more of the monitoring devices 320 may include one or more sensing wires wrapped around one or more insulated wires of one or more of the communication channels 302 such that the sensing wire(s) are incapable of injecting data, messages and/or signals to the communication channel(s) 302. By analyzing the electric load, current and/or voltage of the signals travelling (propagating) through the insulated wires of the communication channel(s) 302 as sensed by the sensing wire(s), the monitoring device(s) 320 may detect messages exchanged over the communication channel(s) 302 and intercept them. In another example, one or more of the monitoring devices 320 may include a wireless receiver-only capable of intercepting wireless messages exchanged between one or more of the devices 210 while incapable of transmitting messages.

In order to be able to correlate the intercepted messages with time and/or space attributes, the monitoring device(s) 320 may assign metadata to one or more of the intercepted messages which may be naturally be intercepted at different communication channels 302 at different times. The metadata assigned to the intercepted message(s) may include, for example, a time tag indicating a time of interception of the respective message, a source communication channel 302 where the respective message is intercepted and/or the like. The metadata assigned to the intercepted messages may be used to correlate messages intercepted at various times and/or locations (communication channels 302) to create one or more time continuum and/or space continuum meta-events. The meta-event(s) may be arranged as one or more unified time ordered datasets reflecting typical patterns and behavior of communication traffic (message transmission) over the communications channel(s) 302 of the vehicle 202.

The intercepted messages may be transferred (exported) to the analysis server 230 and/or to the analysis device 210 for analysis.

One or more of the devices 310 may be adapted to control a network interface such as the network interface 212 for connecting to a network such as the network 240 to transmit the intercepted messages to the analysis server 230.

The system 300 may further include an analysis device such as the analysis device 210 which may receive the intercepted messages from the monitor(s) 320.

Optionally, one or more mechanisms are applied to reduce the volume of the exported message data transferred to the to the analysis server 230 and/or to the analysis device 210 thus reducing the networking bandwidth required for the transfer. Reducing the bandwidth may be essential due to one or more limitations, for example, limited network resources (bandwidth, latency, etc.), limited computing resources, limited storage resources and/or the like. For example, a single low speed CAN bus running at 250 Kb/s, utilized on average to 80 Kb/s may generate 10 KB of messages data per second. As such the message data for the single CAN bus per day (10 hours) may amount to about 360 MB.

The mechanisms applied to reduce the message data include, for example:

Transmitting a relative timestamp for one or more of the intercepted messages. An absolute (real) timestamp may be periodically assigned to an intercepted message every predefined period (e.g. every minute) and each following message may be assigned with a relative offset counter. This may significantly reduce the data volume of the time stamps.

Compressing the identifiers (IDs) of intercepted messages. The message ID field may be significantly large for one or more of the protocols employed in the vehicle 202. For example, standard CAN bus messages are associated with a 29-bit message IDs. Since the number of intercepted message may be extremely large this may result in significant data volumes. By compressing the message IDs as known in the art the data volume of the messages' IDs may be significantly reduced, for example, by at least 75%.

Compressing the payload of intercepted messages. Multiple intercepted messages may contain similar and/or constant payloads. Repeated and/or constant payloads may therefore be sent once while continuously transmitting only delta data which varies between one or more subsets of the intercepted messages. Optionally, constant messages may be sent once while a message counter and optionally continuously transmitting only the metadata of the intercepted constant messages.

Filtering out one or more of intercepted messages. One or more filtering rules may be defined that dictate filtering out one or more intercepted messages which are unnecessary, redundant, of no interest and/or the like.

The message data volume reduction mechanisms may be applied by one or more components of the system 300, for example, the monitoring device(s) 320, the analysis device(s) 210, the bridge(s) 312 and/or the like. For example, a certain monitoring device 320 may be configured to apply one or more of the filtering rules dictating discarding a status message which is periodically transmitted by one or more of the devices 310. In another example, a certain bridge 312 adapted to transmit the intercepted messages to the analysis server 230 via the network 240 may compress the message ID, the payload and/or the metadata of one or more of the intercepted messages before transmitting them to analysis server 230.

Reference is made once again to FIG. 1 and FIG. 2.

As shown at 102, the process 100 starts with a training phase in which the message analyzer 220 applies a plurality of machine learning models to create a baseline model defining message transmission patterns reflecting the valid operation of the vehicle 202. The baseline model may define one or more message transmission patterns reflecting valid operation and/or behavior of the vehicle 202, for example, a finite range of valid, legitimate and/or normal operation states of the vehicle 202, for example, driving, braking, turning, parking, stopping at a traffic light, following a navigation path, controlling door open/close and/or the like. The baseline model may further define one or more message transmission patterns reflecting legal (valid) transitions between the operation states. Each of the transmission patterns may be defined by one or more of a plurality of features of the messages and/or of message groups, for example, a message rate (frequency), a sequence of messages, an N-gram (predefined sequence), a message size, a message payload entropy, a value distribution in data bytes of the message payload, a cross-correlation between messages intercepted at different segments of the communication channels 302, a cross-correlation of payload between multiple different messages, a cross-correlation of payload between messages over time and/or the like.

The plurality of machine learning models applied by the message analyzer 220 may include a mixture of parametric & non-parametric, supervised, unsupervised and semi-supervised machine learning algorithms to create the baseline model which defines a baseline characterizing the message transmission patterns which are valid for the vehicle 202. The machine learning models may include one or more machine learning probabilistic models, engines and/or algorithms, for example, a neural network, a support vector machine (SVM), a decision tree, a K-Nearest neighbors algorithm, a context tree, a graphical model, a Bayesian net, a random forest, a rotational forest, a deep learning algorithm and/or any other learning algorithm trained as known in the art. The machine learning models may further include spectral clustering, hashing, boosting and/or the like.

The message analyzer 220 may apply the different types of the machine learning models independently, simultaneously and/or in sequence to create the baseline model such that the baseline model defining the valid message transmission patterns of the vehicle 202 is constructed as a flat, a hierarchical, a layered and/or a sequenced model.

The machine learning models may be trained with a plurality of training datasets designed, constructed and/or selected according to the type of the algorithms, i.e. parametric vs. non-parametric, supervised, unsupervised and/or semi-supervised. The training datasets include messages reflecting typical patterns and behavior of communication traffic (message transmission) over the communications channel(s) 302 of the vehicle 202. The training datasets may include stationary data, nonstationary data, descriptive statistics, higher moments, information content and/or the like.

The training datasets may be further designed, adapted, adjusted, constructed and/or selected based on statistical analysis of the message features in real transmission during valid operation of the vehicle 202. Such statistical analysis may be done using one or more Statistical Process Control (SPC) techniques as known in the art, for example, dependent and/or independent random variables, Cumulative Sum (CUSUM), Exponentially Weighted Moving Average (EWMA), Hotelling's $T^2$, Bayesian SPC, likelihood scoring, time series modeling and/or the like.

Optionally, the message analyzer 220 applies dimension reduction to the training datasets to reduce one or more dimensions of the message features defining the messages in the training datasets in order to reduce computing resources such as, for example, computing power, computing time, storage space and/or the like. The message analyzer 220 may apply one or more dimension reduction methods, techniques and/or algorithms as known in the art, for example, feature selection, Principal Component Analysis (PCA), logistic-PCA, Singular Value Decomposition (SVD), t-distributed Stochastic Neighborhood Embedding (t-SNE), clustering and/or the like.

Optionally, the message analyzer 220 trains the machine learning models with training datasets comprising unified time ordered datasets of messages created according to one or more message arrangement rules which may define consolidation of multiple messages to a respective unified time ordered messages datasets. The consolidation may be based on the metadata of the messages which as described herein before may include, for example, the time tag indicating the time of interception of the respective message, the source communication channel 302 where the respective message was intercepted and/or the like. The message arrangement rules may define time based arrangement such that the unified time ordered messages dataset are arranged according to a timing of transmission (and interception) of each of the messages thus consolidating groups of the plurality of messages in a time continuum. For example, a certain message arrangement rule may dictate grouping together multiple messages intercepted within a certain time period, for example, five seconds and/or the like. In another example, a certain message arrangement rule may dictate grouping together multiple messages of the same type intercepted at a specific time period, for example, every round hour and/or the like.

The message arrangement rules may further define space based arrangement such that the unified time ordered messages dataset are arranged to include messages according to an interception location, i.e. a communication channel(s) 302 and/or a segment(s) thereof to consolidate groups of the plurality of messages in a space continuum. For example, a certain message arrangement rule may dictate grouping together multiple messages intercepted at a certain communication channel 302, for example, a CAN bus. In another example, a certain message may propagate from one communication channel 302 to another communication channel 302. A certain message arrangement rule may therefore dictate grouping together multiple messages of the same type intercepted at two communication channels 302 connected through a certain bridge.

The message arrangement rules may also dictate grouping together multiple messages to create unified time ordered datasets based on both time and space attributes. For example, a certain message arrangement rule may dictate grouping together multiple messages intercepted at a certain communication channel 302 within a certain time period, for example, 3 seconds and/or the like. Based on the arrangement rules, a respective unified time ordered dataset may therefore include one or more messages having one or more instances two each intercepted at a different location (channel/segment) at a different time assigned and having a respective time tag and a respective interception location (channel/segment) tag. The trained machine learning models may thus correlate between the two instances of the certain message and identify it as a pattern reflecting valid operation of the vehicle 202.

The message arrangement rules may be based on one or more message attributes, for example, an originating device such as the device 310, a destination device 310, a message type, a message identifier, a message size, a message (payload) content, a message timing, a type of communication channel 302, an identifier of the communication channel 302, an identifier of the segment and/or the like.

The parametric supervised algorithms may be trained with a plurality of annotated training datasets each labeled with a class label associated with a valid message transmission pattern reflecting valid operation of the vehicle 202, for example, a respective one of the plurality of legitimate operation states of the vehicle 202 such as, for example, driving, braking, turning, parking, stopping at a traffic light, following a navigation path, controlling door open/close and/or the like. Moreover, one or more class labels may be associated with valid message transmission pattern reflecting valid transitions between the operation states of the vehicle 202. The annotated training datasets further include predefined values and/or patterns for the messages' features. In order to create an accurate and comprehensive baseline model capable of accurately defining real operation of the vehicle 202, the parametric supervised algorithms trained to create the baseline model may be trained with a large number of training datasets. Each of the training datasets may be selected, adjusted, configured, designed and/or constructed to include multiple features with various values to define a plurality message transmission patterns reflecting valid operation of the vehicle 202. The predefined features and values may evolve with time as the parametric supervised algorithms may be trained with new training datasets and/or with real datasets comprising data extracted from the intercepted messages exchanged on the communications channels 302 of the vehicle 202. The features defined for the training datasets may include, for example:

Messages rate—a frequency in which each message is sent.
Messages size.
Messages payload—entropy of the payload of each message and a value distribution in data bytes of the payload of each message.
Sequences of messages, for example, N-grams which are predefined sequences of messages, learned sequences of messages and/or the like.
Cross-correlation of messages across different network segments
Cross-correlation of payload between multiple different messages As described herein before, the training datasets may be adapted to reflect the time and space continuum for the intercepted messages as well as for the unified time ordered datasets of messages. For example, a certain message may traverse (propagate) multiple communication channels 302 and/or segments thereof as it is being forwarded and/or relayed between the communication channels 302 and/or the segments. As such a certain message may be intercepted multiple times at multiple locations (channel/segment). For example, the certain message may be intercepted at a first communication channel 302, for example, the communication channel 302A at time t=0 seconds and at a second communication channel 302, for example, the communication channel 302B at time t=3 seconds. These two intercepted messages may naturally correlate with each other.

During the training phase the parametric supervised algorithms may adjust their weights to accurately cluster and classify each of the training datasets to match the labels assigned to each training dataset.

The non-parametric semi-supervised algorithms may be trained with a plurality of annotated training datasets each labeled with a class label indicating a respective one of the plurality of valid message transmission patterns. However, in contrast to the training datasets used to train the parametric supervised algorithms, these training datasets do not include predefined values and/or patterns for the messages' features. The values and/or patterns of the features of the messages and/or of the unified time ordered datasets are rather learned by the non-parametric semi-supervised algorithms based on analysis of the training datasets. The non-parametric semi-supervised algorithms may identify relations, correlations and/or patterns of the messages included in the training datasets and adjust their weights accordingly to accurately cluster and classify each of the training datasets to match the labels assigned to each training dataset.

By applying the non-parametric semi-supervised algorithms to adjust the baseline model, the valid message transmission patterns may be expressed through values and/or patterns of the features which are not predefined in advance and are therefore not limited as may be the case for the parametric supervised algorithms. Rather the non-parametric semi-supervised may evolve and learn features sets corresponding, correlating and/or indicative of respective valid message transmission patterns reflecting valid operation of the vehicle 202.

The non-parametric unsupervised algorithms may be trained with a plurality of training datasets which are not annotated and do not include predefined values and/or patterns for the messages' features. In this case, the non-parametric unsupervised algorithms may cluster the training datasets to clusters according to the values and/or patterns identified for the messages' features based on analysis of the training datasets. The non-parametric unsupervised algorithms may identify relations, correlations and/or patterns of the messages' features included in the training datasets and adjust their weights accordingly to cluster and classify each of the training datasets to respective clusters presenting similar values and/or patterns for the messages' features.

By applying the non-parametric unsupervised algorithms to adjust the baseline model, the baseline model may be expanded and enhanced to include valid message transmission patterns which are not predefined in advance and are therefore not limited to predefined message transmission patterns as may be the case for both the parametric supervised algorithms and/or the non-parametric semi-supervised algorithms. Rather the non-parametric unsupervised creates and identifies clusters which comprise messages and/unified time ordered datasets of messages which share similarity (within a certain deviation, i.e. threshold) of the values and/patterns identified for the messages' features in the training datasets.

While each of the types of algorithms may present benefits and advantages, they may each suffer some inherent deficiencies. Therefore by applying a combination of all types of algorithms, specifically the parametric supervised algorithms, the non-parametric semi-supervised and the non-parametric unsupervised, the message analyzer 220 may create the baseline model to be an accurate and comprehensive model which overcomes the limitations presented by each type of algorithms. The parametric supervised algorithms may define a clear baseline of the valid, legitimate and/or allowed message transmission patterns expressed by the predefined values and/or features of the messages and/or of the unified time ordered datasets which in turn reflect valid operation and/or behavior of the vehicle 202. The non-parametric semi-supervised algorithms may expand the baseline model to include predefined message transmission patterns which are defined (expressed) by the learned values and/or features of the messages and/or of the unified time ordered datasets. The Non-parametric unsupervised algorithms may further expand the baseline model to include message transmission patterns which are not predefined and are expressed by the learned values and/or features of the messages and/or of the unified time ordered datasets.

According to some embodiments of the present invention, the message analyzer 220 may apply the machine learning models in a phased (sequenced) processing pipeline to create the baseline model. The message analyzer 220 may break down the intercepted messages to multiple processing stages thus creating a pipelined representation of the baseline model defining valid message transmission patterns reflecting valid operation and behavior of the vehicle 202.

Figure 4:
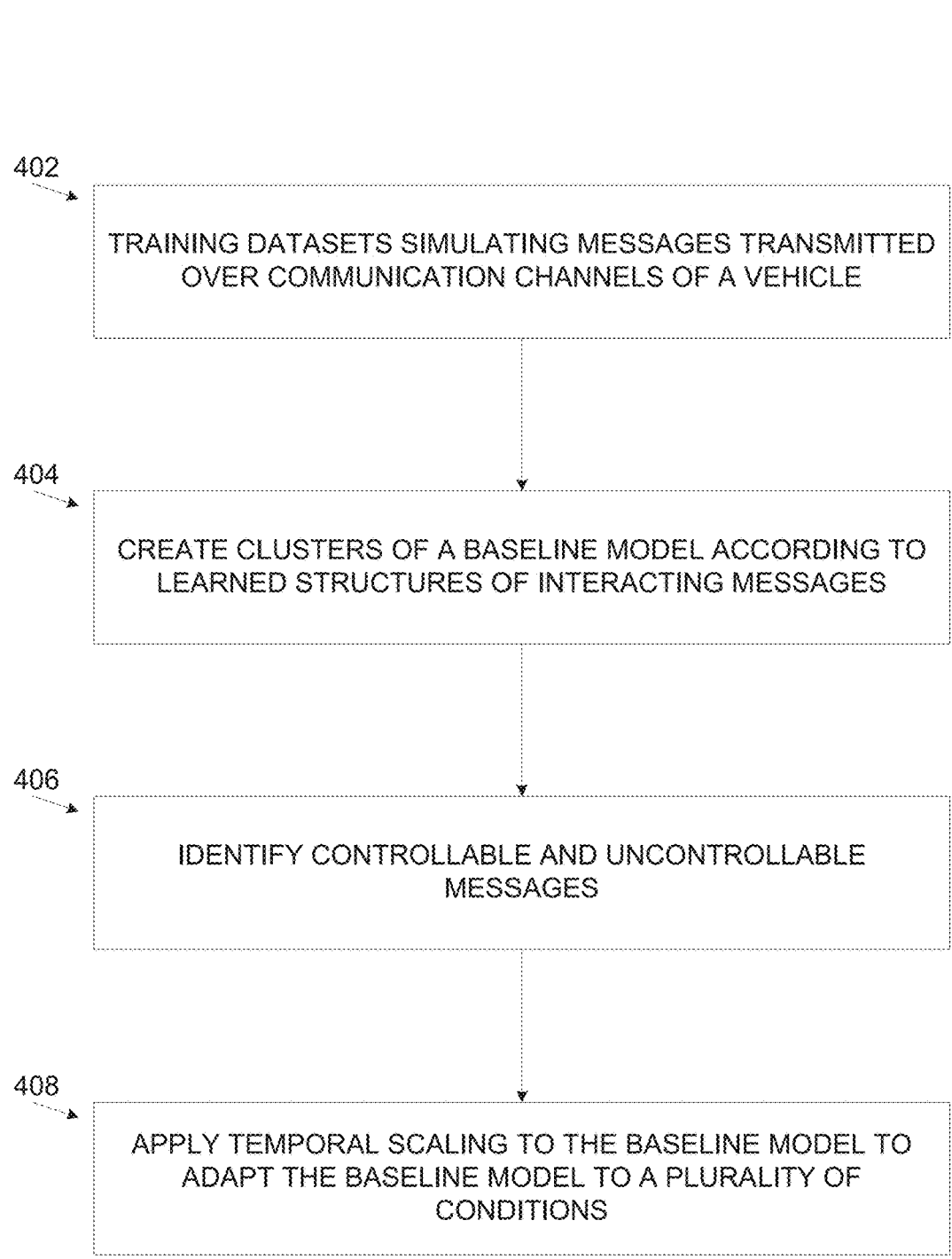
FIG. 4 is a flowchart of an exemplary phased processing pipeline process for creating a baseline model, according to some embodiments of the present invention.

Reference is now made to FIG. 4, which is a flowchart of an exemplary phased processing pipeline process for creating a baseline model, according to some embodiments of the present invention. An exemplary process 400 may be executed by a message analyzer such as the message analyzer 220 training the plurality of machine learning models in the phased processing pipeline to create the baseline model. The exemplary process 400 presents a sequenced construction of the baseline model in which the message analyzer 220 applies two sets of machine learning models in sequence. However, the exemplary implementation described by the process 400 should not be construed as limiting since the machine learning models may be applied independently, simultaneously and/or in sequence in a plurality of manners, sequences and/or hierarchies.

As shown at 402, the process 400 starts with the message analyzer 220 receiving a plurality of training samples comprising messages and/or unified time ordered datasets reflecting typical, valid and/or legal patterns and/or behavior of communication traffic (message transmissions) over one or more communications channel(s) such as the communications channel(s) 302 and/or segments thereof of a vehicle such as the vehicle 202.

As shown at 404, the message analyzer 220 applies a first set of machine learning models, for example, the non-parametric unsupervised algorithms to the training datasets to automatically identify and group together messages in respective clusters of the baseline model. The first set of machine learning models may cluster the messages according to the message features, for example, the message types which are correlated, i.e. interacting, indicative, associated and/or the like such that a change in one message may cause a change in one or more other correlated messages of the group.

Figure 5:
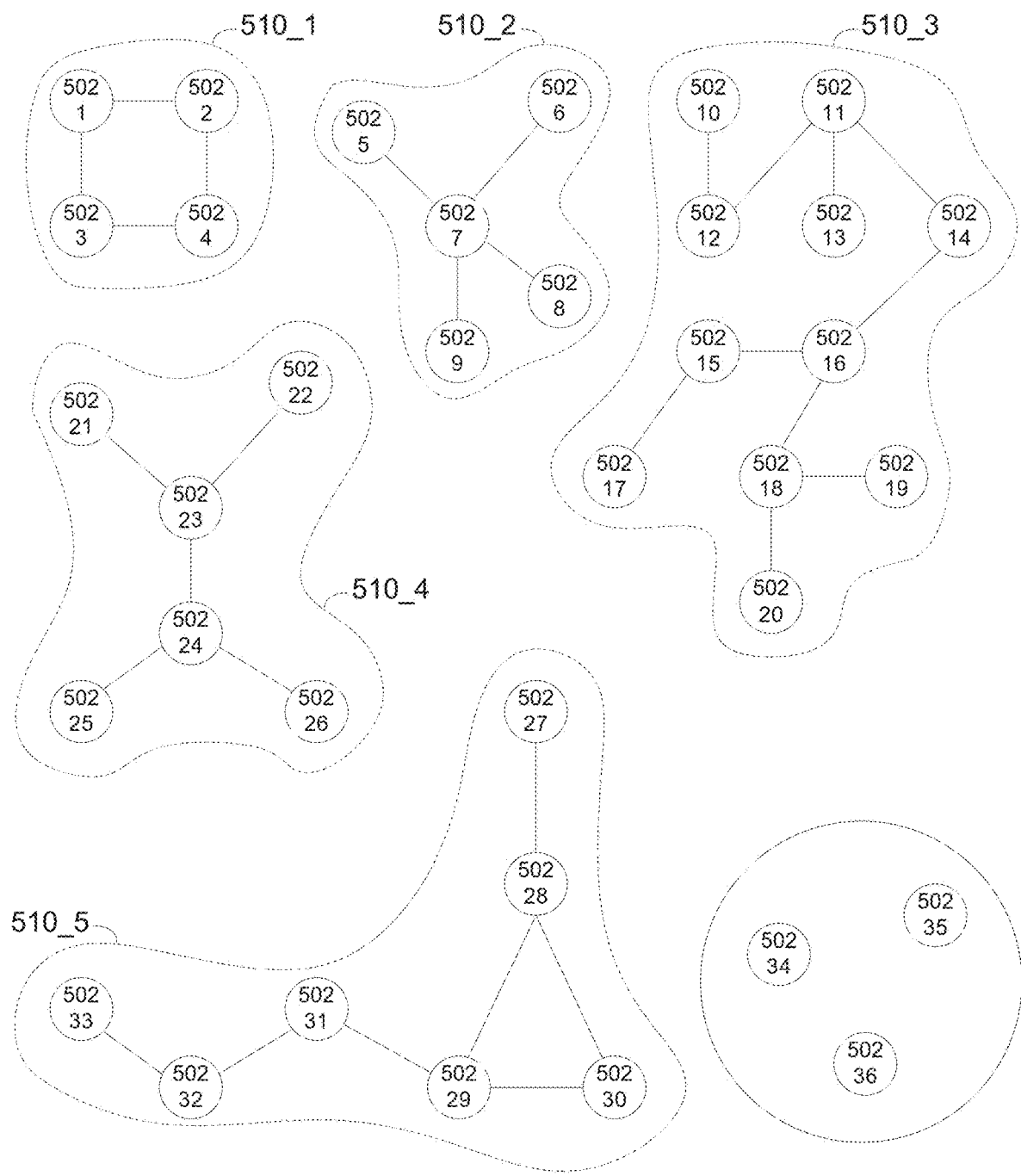
FIG. 5 is a schematic illustration of exemplary message clusters created by applying machine learning models to messages intercepted in a vehicular environment, according to some embodiments of the present invention.

Reference is now made to FIG. 5, which is a schematic illustration of exemplary message clusters created by applying machine learning models to messages intercepted in a vehicular environment, according to some embodiments of the present invention. A message analyzer such as the message analyzer 220 applying the first set of machine learning models may create a plurality of clusters 510 each comprising a plurality of correlated messages or message types 502. For example, a cluster 510_1 may include messages and/or message types 502 1, 502 2, 502 3 and 502 4. In another example, a cluster 510_2 may include messages and/or message types 502 5, 502 6, 502 7, 502 8 and 502 9. In another example, a cluster 510_3 may include messages and/or message types 502 10, 502 11, 502 12, 502 13, 502 14, 502 15, 502 16, 502 17, 502 18, 502 19 and 502 20. In another example, a cluster 510_4 may include messages and/or message types 502 21, 502 22, 502 23, 502 24, 502 25 and 502 26. In another example, a cluster 510_5 may include messages and/or message types 502 27, 502 28, 502 29, 502 30, 502 31, 502 32 and 502 33. As seen some messages and/or message types, for example, 502 34 502 35 and 502 36 are not clustered to any of the clusters 510 as they do not present any correlation with other messages and/or message types 502.

Figure 6:
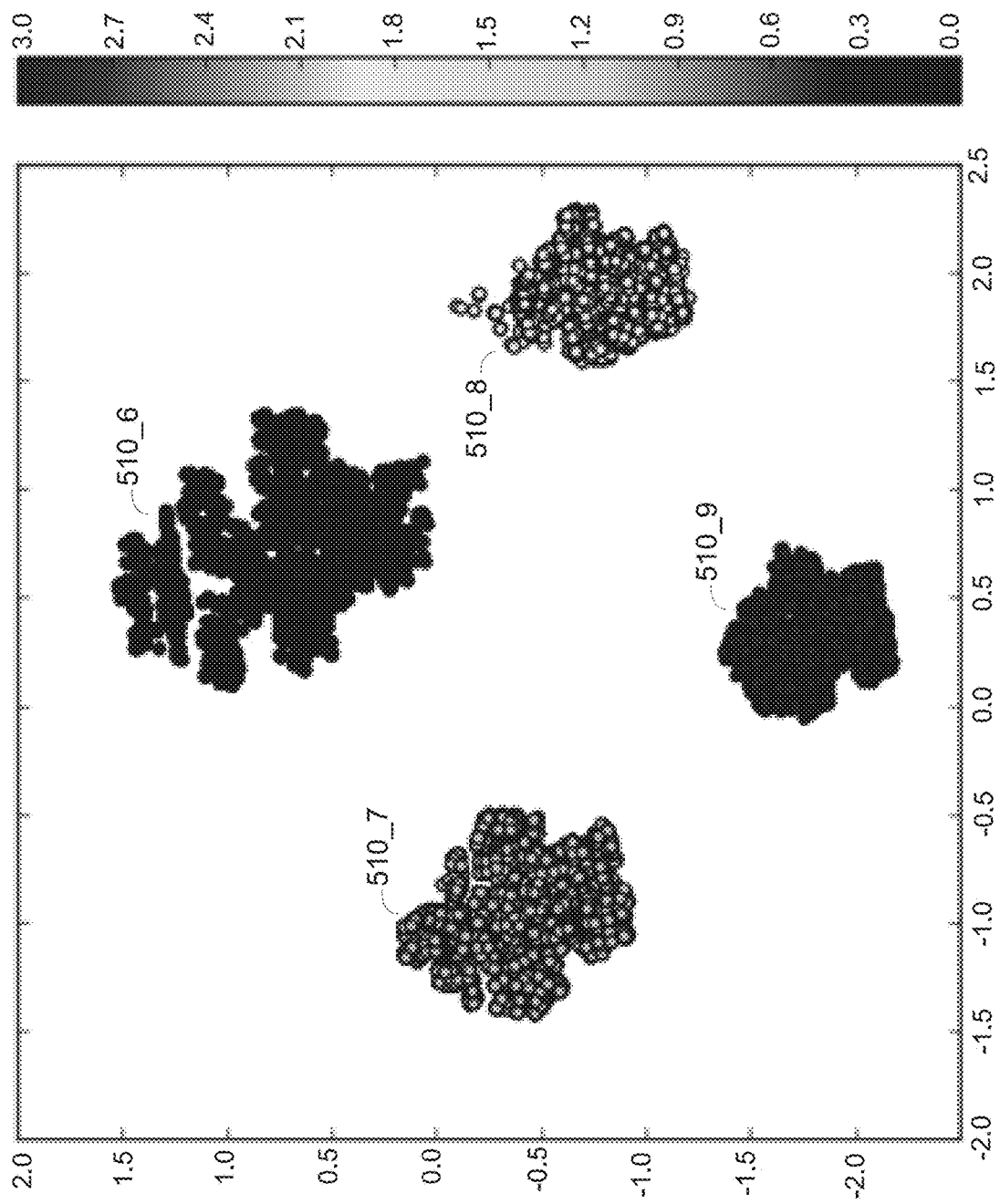
FIG. 6 is a graph chart of an exemplary 2 dimensional space distribution of messages clusters created by applying machine learning models to messages intercepted in a vehicular environment, according to some embodiments of the present invention.

Reference is now made to FIG. 6 is a graph chart of an exemplary 2 dimensional space distribution of messages clusters created by applying machine learning models to messages intercepted in a vehicular environment, according to some embodiments of the present invention. As seen, when casting an exemplary message type on a 2 dimensional plane as may be done by the first set of machine learning models, different clusters, for example, a cluster 510_6, a cluster 510_7, a cluster 510_8 and a cluster 510_9 may be grouped to well defined groups of messages according to their payload feature values.

Figure 7:
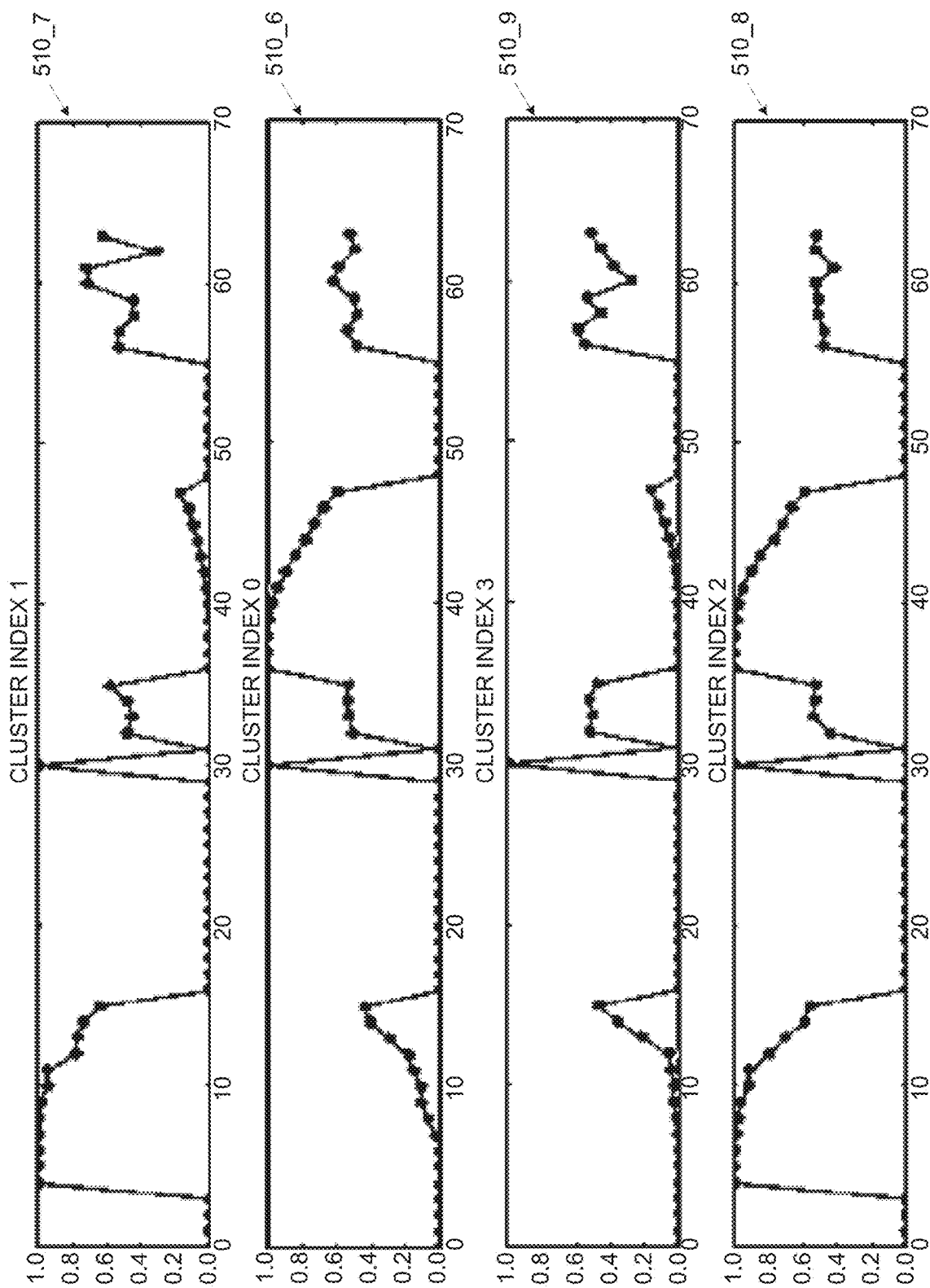
FIG. 7 presents graph charts mapping payload bit values for messages classified to different clusters by machine learning models machine learning models, according to some embodiments of the present invention.

Reference is also made to FIG. 7, which presents graph charts mapping payload bit values for messages classified to different clusters by machine learning models machine learning models, according to some embodiments of the present invention. The graph chart presents an average bit values for the payloads of the messages in each of the clusters 510_6, 510_7, 510_8 and 510_9 where a value "1" indicates that all payloads in the respective cluster have the value "1" for the perspective bit, and vice versa, a value "0" indicates that all payloads in the respective cluster have the value "0" for the perspective bit. A value of "0.5" indicates a bit that is practically random within the respective cluster. As evident from the charts, each of the clusters 510_6, 510_7, 510_8 and 510_9 has a distinct set of values, and further, each pair of the clusters 510_6, 510_7, 510_8 and 510_9 may be a mirror image of another one of the clusters 510_6, 510_7, 510_8 and 510_9.

Reference is made once again to FIG. 4.

As shown at 406, after establishing the clusters according to the identified correlation links, the message analyzer 220 may apply a second set of machine learning models, for example, the parametric supervised algorithms to the training datasets to break down the various relevant message types to controllable and non-controllable messages where controllable messages refers to messages presenting a limited number of legitimate feature(s) values compared to uncontrollable messages which may presenting any random value for one or more of the features. Based on the identified controllable and non-controllable messages, the message analyzer 220 may update the baseline model to reflect possible legitimate message transmission patterns corresponding to valid (legitimate) operation of the vehicle 202, for example, valid operation states of the vehicle 202 and optionally allowable transitions between the states. The message analyzer 220 may update the baseline model to reflect an expected message transmission pattern for each of these messages independently (for each message type separately) as well as expected dependency (correlation) patterns between messages, i.e. the clusters of interacting messages.

As shown at 408, the message analyzer 220 may apply temporal scaling to the baseline model by applying additional metadata comprising condition variables which may apply further constraints to the baseline model in order to adapt the baseline model to various operational conditions as indicated by the metadata variables. For example, the metadata variables may define one or more environment condition attributes such as, for example, day/night, rain, wind, ice on road, high/low temperature and/or the like. By applying the environment condition attribute(s), the baseline model may adapt to specific environmental and/or weather conditions by correlating certain message feature(s) values and/or message transmission patterns with the respective environmental and/or weather conditions. In another example, the metadata variables may define one or more geographical location attributes received for example, from a GPS sensor and/or a GPS system. The geographical location attributes may include for example, urban area, countryside, highway, dirt road, mountain area and/or the like. By applying the geographical location attribute(s), the baseline model may adapt to specific geographical location conditions by correlating certain message feature(s) values and/or message transmission patterns with the respective geographical location conditions.

Figure 8:
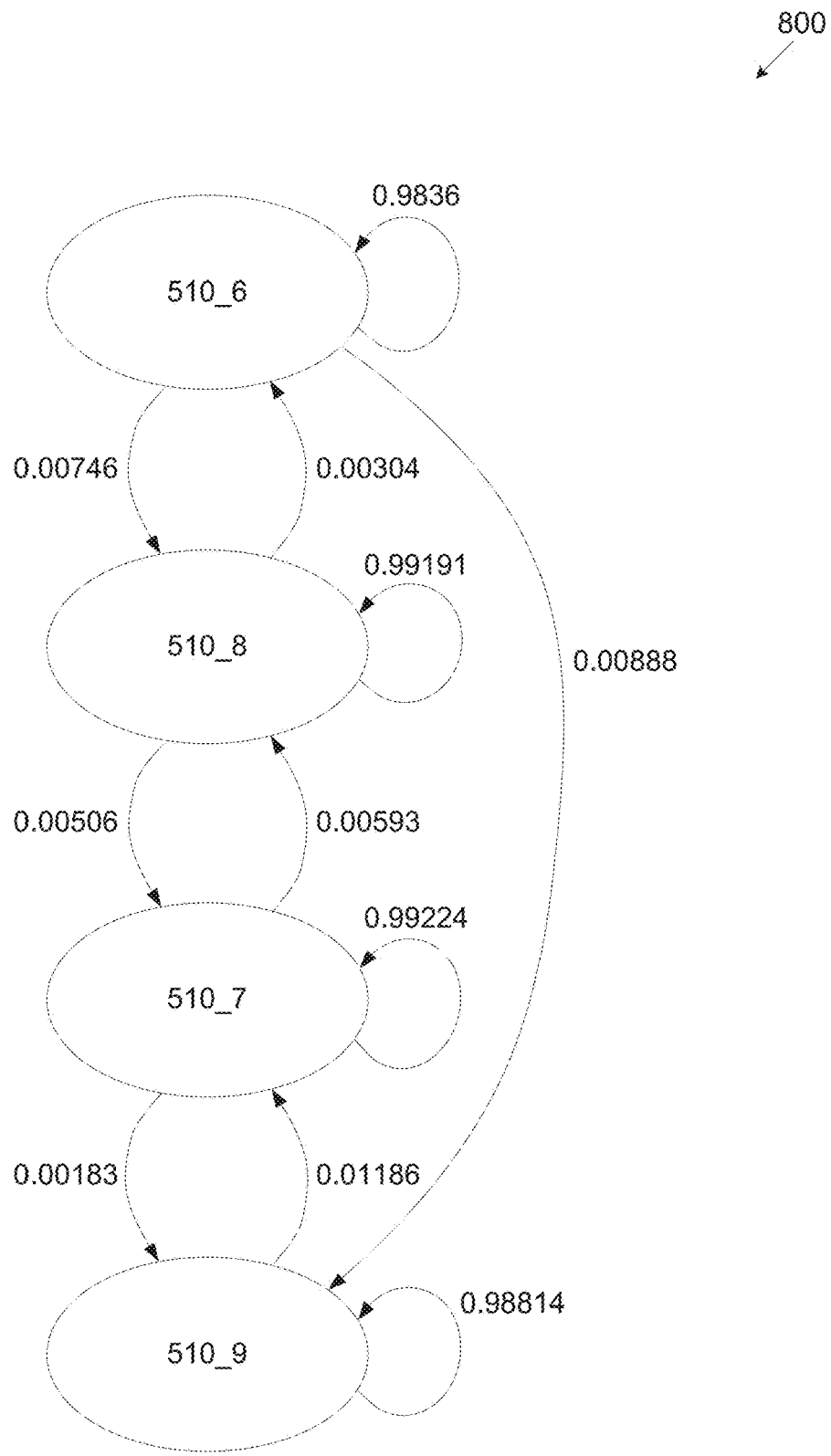
FIG. 8 is a schematic illustration of an exemplary state machine describing state transition between messages clusters identified by applying machine learning models to messages intercepted in a vehicular environment, according to some embodiments of the present invention.

Reference is now made to FIG. 8, which is a schematic illustration of an exemplary state machine describing state transition between messages clusters identified by applying machine learning models to messages intercepted in a vehicular environment, according to some embodiments of the present invention. A state machine 800 which may be a segment of the baseline model presents an exemplary state transition probability distribution for transitions between clusters of messages identified by a set of machine learning models, for example, the first set of machine learning models. The state machine 800 may be created by the message analyzer 220 applying the temporal scaling to clusters such as the clusters 510_6, 510_7, 510_8 and 510_9. As seen from the state machine 800 transitions are identified during the training phase between some of the clusters 510, for example, a transition from the cluster 510_6 to the cluster 510_8, a transition from the cluster 510_6 to the cluster 510_9, a transition from the cluster 510_8 to the cluster 510_6, a transition from the cluster 510_8 to the cluster 510_6 and more. Moreover, a probability score may be calculated and assigned to each such transition to indicate a probability of the respective transition to actually occur. Some transition however, are not identified during the training phase, for example, there is no transition from the cluster 510_6 to the cluster 510_7 and vice versa, there is no transition from the cluster 510_8 to the cluster 510_9 and vice versa and so on. This may indicate that two consecutive messages may not belong to such unconnected clusters 510. For example, assuming a first message which is clustered to the cluster 510_6 is followed by a second message, the second message may not belong to the cluster 510_7. However, the second message may belong to the cluster 510_8 or the cluster 510_9 with the respective probabilities as indicated by the state machine 800.

Reference is made once again to FIG. 1 and FIG. 2.

The steps 104, 106, 108 and 110 of the process 100 are conducted by the message analyzer 220 in real time after creating the baseline model during the training phase described in step 102.

As shown at 104, the message analyzer 220 receives a plurality of messages intercepted at one or more of the communication channels 302 and/or segments thereof. As described herein above, the message analyzer 220 may be locally executed by the analysis device 210 which is connected to one or more of the communication channels 302 as described for the system 300. In such case, the message analyzer 220 may receive the intercepted messages from one or more monitors such as the monitor 320 adapted to monitor the communication channel(s) 302 and intercept transmitted messages. In case the message analyzer 220 is remotely executed by the analysis server 230, the message analyzer 220 may receive the intercepted messages from the message collector 222 which may collect the intercepted messages from the monitor(s) 320 and forward them to the analysis server 230 via the network 240.

Optionally, multiple messages may be grouped together according to the message arrangement rule(s) to create one or more unified time ordered datasets comprising multiple messages.

As shown at 106, the message analyzer 220 attempts to map, i.e. cluster, classify and/or the like each of the intercepted messages to the baseline model. The message analyzer 220 may analyze each intercepted message to identify one or more features of the message and their respective value(s) and map the message to the baseline model according to the detected feature(s) and their value(s). The mapping process (e.g. clustering, classification, etc.) may be very similar to the process described for the training phase with the exception that the intercepted messages are naturally not labeled.

Optionally, in case one or more unified time ordered datasets are available, i.e. received, the message analyzer 220 attempts to map (e.g. cluster, classify, etc.) each of the unified time ordered datasets to the baseline model according to the correlation between messages of the unified time ordered dataset and/or according to one or more features, characteristics and/or attributes of the messages included in the unified time ordered dataset.

As shown at 108, the message analyzer 220 may identify one or more messages and/or unified time ordered datasets which are incompliant with the baseline model, i.e. the incompliant message(s) may not be mapped (e.g. clustered, classified, etc.) to any of the message transmission patterns defined by the baseline model which reflect the valid operation of the vehicle 202. The inability of the message analyzer 220 to map the incompliant message into the baseline model may be indicative that the transmission of the incompliant message is not defined be the valid message transmission patterns and may rather result from one or more abnormal events which occurred in the operational environment of the vehicle 202. Such abnormal events may be indicative of one or more malicious devices present in the operational environment of the vehicle 202 executed by a system such as the system 300 of the vehicle 202. Additionally and/or alternatively, the abnormal event may be indicative of one or more malfunctions and/or failures of one or more of the devices 310 which transmitted the incompliant message(s) due to a failure in their normal operation mode(s).

For example, assuming that according to the baseline model, a message indicating a speed change received, for example, from a speed sensor is preceded by a message indicating a change in position of the acceleration throttle received, for example, from a throttle position sensor. Such message transmission pattern may typically be used for training the machine learning models and is hence reflected in the baseline model. In case a speed change message intercepted in real time in the operational environment of the vehicle 202 is not preceded by such a throttle position change message, the message analyzer 220 may be unable to classify the speed change message since it is incompliant with the baseline model. The message analyzer 220 may therefore determine that such an incompliant message resulted from one or more abnormal events taking place in the operational environment of the vehicle 202. The abnormal event reflected by the transmission of the incompliant message may result from a failure or malfunction of one or more of the devices 310, for example, a throttle position sensor and/or the like. Additionally and/or alternatively, the abnormal event reflected by the transmission of the incompliant message may be indicative of a malicious party using a malicious device (deployed in the system 300 of the vehicle 202) to transmit a malicious message for one or more malicious objectives, for example, hijack the vehicle 202, cause an accident and/or the like.

In another example, some types of messages are periodically received from their respective sensors and/or devices, for example, throttle messages indicating a current position of the acceleration throttle and speed messages indicating a current speed of the vehicle 202. Further assuming an increase in a payload value of the throttle message indicates an increase in the position of the throttle, i.e. acceleration command and vice versa. Assuming that the baseline model defines that a speed increase reflected by an increase in the payload value of the throttle messages is correlated with a speed increase reflected by an increase in the payload value of the speed messages. In case the payload values of the speed messages and the throttle messages intercepted in real time in the operational environment of the vehicle 202 within a predefined time interval (e.g. 100 ms) are inconsistent with each other, the message analyzer 220 may be unable to classify this message sequence (transmission pattern) in the baseline model and may therefore determine the message sequence is incompliant with the baseline model. The message analyzer 220 may therefore determine that such incompliant message sequence (pattern) resulted from one or more abnormal events taking place in the operational environment of the vehicle 202.

In another example, assuming that according to the baseline model, a message indicating of acceleration (i.e. speed increase) is preceded by a message indicating a change of traffic light from red to green received for, example, from a device 310 analyzing image(s) captured by an imaging sensor depicting the traffic light. Such a sequence of messages (message transmission pattern) may be thus reflected in the baseline model. In case an acceleration message intercepted in real time in the operational environment of the vehicle 202 is not preceded by such a traffic light change message, the message analyzer 220 may be unable to classify the detected acceleration message since it is incompliant with the respective message transmission pattern defined by the baseline model. The message analyzer 220 may therefore determine that such an incompliant message resulted from one or more abnormal events taking place in the operational environment of the vehicle 202.

The above examples are simplistic illustrated to present the concept of the analysis of message features to identify message(s) which are incompliant with the baseline model. Naturally the baseline model may be created and trained to map far more complex transmission patterns of messages and/or unified time ordered subsets.

As shown at 110, upon detection of the abnormal event(s), the message analyzer 220 may initiate one or more actions accordingly to contain and/or inform of the abnormal event(s). For example, the message analyzer 220 may initiate an abnormal event alert to one or more parties, for example, a driver of the vehicle 202, a security service associated with the vehicle 202, an emergency service and/or the like. In another example, the message analyzer 220 may operate the vehicle to prevent, circumvent and/or bypass potentially malicious and/or erroneous control message(s) to prevent the incompliant message from affecting the normal operation of the vehicle 202. In another example, the message analyzer 220 may apply one or more security measures to identify and/or isolate the potentially malicious device(s). In another example, the message analyzer 220 may deploy emergency and/or maintenance procedures to encounter one or more failures and/or malfunctions estimated based on analysis of the incompliant message(s).

It is expected that during the life of a patent maturing from this application many relevant systems, methods and computer programs will be developed and the scope of the terms machine learning algorithms and/or vehicle communication channels are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

In addition, any priority document(s) of this application is/are hereby incorporated herein by reference in its/their entirety.

What is claimed is:

1. A computer implemented method of identifying an abnormal event in an operational environment of a vehicle, comprising:
using at least one processor adapted for:
receiving a plurality of messages intercepted by at least one device adapted to monitor messages transmitted via at least one segment of at least one communication channel of a vehicle;
arranging at least one subset of the plurality of messages in at least one unified time ordered dataset consolidating the messages of the at least one subset according to at least one message arrangement rule;
mapping the at least one unified time ordered dataset to a baseline model according to at least one of a plurality of features identified for at least one of the messages of the at least one subset, the plurality of features comprising relating to a timing of the at least one message and to a content of the at least one message, the baseline model which defines a plurality of learned message sequence patterns is created and adjusted by training a plurality of different machine learning algorithms that are applied independently on a plurality of training datasets comprising a plurality of training unified time ordered datasets reflecting valid operation of the vehicle;
identifying incompliance of the at least one unified time ordered dataset with the baseline model, the incompliance is indicative of at least one abnormal event in the operation of the vehicle; and
generating an alert indicative of the at least one abnormal event;
wherein the at least one message arrangement rule defines at least one of: a time based arrangement and a space based arrangement, the time based arrangement relates to at least one timing attribute of the messages of the at least one subset, the space based arrangement relates to a communication channel segment in where the messages of the at least one subset are intercepted.

2. The computer implemented method of claim 1, further comprising the at least one device adapted to monitor the transmitted messages is a receiver-only device incapable of altering transmission signals of the at least one segment of at least one communication channel.

3. The computer implemented method of claim 1, wherein the at least one processor is integrated in at least one vehicular device of the vehicle.

4. The computer implemented method of claim 1, wherein the at least one processor is integrated in a remote system receiving the plurality of messages transmitted by the vehicle via at least one network.

5. The computer implemented method of claim 1, wherein the plurality of features further comprising at least one of: a message type, a message identifier, a message rate, a message timing, a sequence of messages in the at least one subset, a message size, a message content, a correlation between the at least one message and at least one previously intercepted message and a cross-correlation between the at least one message and at least one another message intercepted in at least one another communication channel segment.

6. The computer implemented method of claim 1, wherein the plurality of machine learning algorithms comprising at least one parametric supervised algorithm trained with a plurality of labeled training datasets comprising a plurality of training messages having a plurality of predefined features to adjust the baseline model according to a label and at least one of the plurality of predefined features identified for each of the plurality of training messages, the label indicates a class of messages corresponding to a valid message transmission pattern reflecting valid operation of the vehicle.

7. The computer implemented method of claim 1, wherein the plurality of machine learning algorithms comprising at least one non-parametric semi-supervised algorithm trained with a plurality of labeled training datasets comprising a plurality of training messages to adjust the baseline model according to a label of each of the plurality of training messages and at least one of a plurality of features learned for each training message, the label indicates a class of messages corresponding to a valid message transmission pattern reflecting valid operation of the vehicle.

8. The computer implemented method of claim 1, wherein the plurality of machine learning algorithms comprising at least one non-parametric unsupervised algorithm trained with a plurality of unlabeled training datasets comprising a plurality of training messages to adjust the baseline model according to at least one valid message transmission pattern identified based on at least one of the plurality of features learned for each of the plurality of training messages.

9. The computer implemented method of claim 1, wherein at least one of the plurality of machine learning algorithms is trained to evaluate compliance of the at least one unified time ordered dataset independently of at least one another unified time ordered dataset.

10. The computer implemented method of claim 1, wherein at least one of the plurality of machine learning algorithms is trained to evaluate compliance of the at least one unified time ordered dataset according to a correlation between the at least one unified time ordered dataset and at least one another unified time ordered dataset.

11. The computer implemented method of claim 1, further comprising reducing at least one dimension of the plurality of intercepted messages by filtering out at least one of the plurality of intercepted messages according to at least one filtering rule.

12. The computer implemented method of claim 1, wherein the at least one message arrangement rule defines consolidation of the at least one subset according to at least one message attribute of at least one of the messages of the subset, the at least one message attribute is a member of a group consisting of: an originating vehicular device, a destination vehicular device, a message type, a message identifier, a message content, a message timing, a type of the at least one communication channel and an identifier of the at least one segment.

13. The computer implemented method of claim 1, further comprising the baseline model defines at least one condition variable associated with at least one of valid operation of the vehicle under at least one operational condition.

14. The computer implemented method of claim 13, wherein said at least one condition variable is a member of a group consisting of weather conditions, road conditions and geographical area conditions.

15. A system for identifying an abnormal event in an operational environment of a vehicle, comprising:
   a program store storing a code; and
   at least one processor coupled to the program store for executing the stored code, the code comprising:
      code instructions to receive a plurality of messages intercepted by at least one device adapted to monitor messages transmitted via at least one segment of at least one communication channel of a vehicle;
      code instructions to arrange at least one subset of the plurality of messages in at least one unified time ordered dataset consolidating the messages of the at least one subset according to at least one message arrangement rule;
      code instructions to map the at least one unified time ordered dataset to a baseline model according to at least one of a plurality of features identified for at least one of the messages of the at least one subset, the plurality of features comprising relating to a timing of the at least one message and to a content of the at least one message, the baseline model which defines a plurality of learned message sequence patterns is created and adjusted by training a plurality of different machine learning algorithms that are applied independently on a plurality of training datasets comprising a plurality of training unified time ordered datasets reflecting valid operation of the vehicle;
      code instructions to identify an incompliance of the at least one unified time ordered dataset with the baseline model, the incompliance is indicative of at least one abnormal event in the operation of the vehicle; and
      code instructions to generate an alert indicative of the at least one abnormal event;
   wherein the at least one message arrangement rule defines at least one of: a time based arrangement and a space based arrangement, the time based arrangement relates to at least one timing attribute of the messages of the at least one subset, the space based arrangement relates to a communication channel segment in where the messages of the at least one subset are intercepted.

* * * * *